US006451413B1

(12) United States Patent
Aurenty et al.

(10) Patent No.: US 6,451,413 B1
(45) Date of Patent: Sep. 17, 2002

(54) METHOD OF PREPARING A PRINTING PLATE AND PRINTING PLATE

(75) Inventors: Patrice M. Aurenty, Wood-Ridge; Alexander Grant, Bloomfield, both of NJ (US); Jen-Chi Huang, Columbus, GA (US); William P. Keaveney, Pompton Plains; Edward Stone, Morris Plains, both of NJ (US)

(73) Assignee: Kodak Polychrome Graphics LLC, Norwalk, CT (US)

( * ) Notice: Subject to any disclaimer, the term of this patent is extended or adjusted under 35 U.S.C. 154(b) by 0 days.

(21) Appl. No.: 09/494,223

(22) Filed: Jan. 27, 2000

Related U.S. Application Data

(63) Continuation-in-part of application No. 09/244,580, filed on Feb. 4, 1999.

(51) Int. Cl.$^7$ .................... B23B 3/00; B41M 3/12; B41M 3/00
(52) U.S. Cl. .................. 428/195; 428/209; 428/458; 428/461; 427/152; 427/541; 101/457; 101/463.1; 101/465; 101/466
(58) Field of Search ................... 428/500, 461, 428/195, 209, 458; 101/466, 465, 457, 463.1; 427/152, 541

(56) References Cited

U.S. PATENT DOCUMENTS

| | | | |
|---|---|---|---|
| 3,607,473 A | * 9/1971 | Grunwald et al. ............. 156/2 |
| 3,877,372 A | 4/1975 | Leeds ......................... 101/465 |
| 4,278,467 A | 7/1981 | Fadner ........................ 106/2 |
| 4,365,043 A | 12/1982 | Konishi et al. ............... 525/113 |
| 4,544,624 A | 10/1985 | Nanpei et al. ............... 540/281 |
| 4,718,340 A | 1/1988 | Love, III .................... 101/116 |
| 4,781,985 A | 11/1988 | Desjarlais ................... 428/421 |
| 4,833,486 A | 5/1989 | Zerillo ........................ 346/1.1 |
| 4,854,969 A | 8/1989 | Bassemir et al. ............. 106/2 |
| 4,954,395 A | 9/1990 | Hasegawa et al. ......... 428/318.4 |
| 5,096,781 A | 3/1992 | Vieira et al. ............... 428/411.1 |
| 5,104,484 A | * 4/1992 | Nakanishi et al. .......... 156/651 |
| 5,141,556 A | 8/1992 | Matrick ....................... 106/20 |
| 5,171,655 A | * 12/1992 | Aoshima .................... 430/138 |
| 5,198,467 A | * 3/1993 | Milks ......................... 514/553 |
| 5,266,443 A | 11/1993 | Higashi et al. ............. 430/272 |
| 5,312,654 A | * 5/1994 | Arimatsu et al. ........... 427/511 |
| 5,316,575 A | 5/1994 | Lent et al. ................. 106/20 R |
| 5,334,485 A | * 8/1994 | Van Iseghem et al. ...... 430/287 |
| 5,364,702 A | 11/1994 | Idei et al. .................. 428/423.1 |
| 5,368,974 A | 11/1994 | Walls et al. ................ 430/156 |
| 5,478,631 A | 12/1995 | Kawano et al. ............. 428/212 |
| 5,551,585 A | 9/1996 | Huang et al. ............... 216/11 |
| 5,656,701 A | 8/1997 | Miyamoto et al. .......... 525/453 |
| 5,677,106 A | * 10/1997 | Burberry et al. ............ 430/253 |
| 5,695,908 A | * 12/1997 | Furukawa .................... 101/466 |
| 5,716,436 A | 2/1998 | Sorriero et al. .......... 106/31.87 |
| 5,738,013 A | 4/1998 | Kellett ...................... 101/463.1 |
| 5,773,194 A | 6/1998 | Hattori et al. ........... 430/284.1 |
| 5,820,932 A | 10/1998 | Hallman et al. ............. 427/261 |
| 5,821,283 A | 10/1998 | Hesler et al. ............... 523/161 |
| 5,861,230 A | 1/1999 | Lambert et al. ............ 430/202 |
| 5,900,345 A | 5/1999 | Platzer et al. .............. 430/156 |
| 5,942,335 A | 8/1999 | Chen et al. ................. 428/500 |
| 5,998,501 A | * 12/1999 | Tsutsumi et al. ........... 523/160 |
| 6,017,677 A | * 1/2000 | Maemoto et al. ........ 430/270.1 |
| 6,090,193 A | * 7/2000 | Nigam et al. ............ 106/31.27 |
| 6,117,921 A | * 9/2000 | Ma et al. .................... 523/161 |
| 6,131,514 A | * 10/2000 | Simons ....................... 101/466 |
| 6,207,346 B1 | * 3/2001 | Johnson .................... 430/284.1 |
| 6,232,369 B1 | * 5/2001 | Ma et al. .................... 523/161 |
| 6,245,121 B1 | 6/2001 | Aurenty et al. .......... 428/304.4 |

FOREIGN PATENT DOCUMENTS

| | | |
|---|---|---|
| CA | 2107980 | 4/1994 |
| DE | 4330428 | 3/1994 |
| EP | 071345 | 2/1983 |
| EP | 101266 | 2/1984 |
| EP | 0503621 | 9/1992 |
| EP | 591916 | 4/1994 |
| EP | 0738608 | 10/1996 |
| EP | 751194 | 1/1997 |
| EP | 829574 | 3/1998 |
| EP | 847868 | 6/1998 |
| EP | 882584 | 12/1998 |
| GB | 2332646 | 6/1999 |
| JP | 62059046 | 9/1988 |
| JP | 63224988 | 9/1988 |
| JP | 9029926 | 2/1997 |
| JP | 9255765 | 9/1997 |
| JP | 08329147 | 6/1998 |
| JP | 10151852 | 6/1998 |
| WO | WO 0046036 | 8/2000 |

OTHER PUBLICATIONS

Owens, "Estimation of the Surface Free Energy of Polymers", *J. Applied Polymer Science*, vol. 13, 1969, pp. 1741–1747.

* cited by examiner

*Primary Examiner*—Paul Thibodeau
*Assistant Examiner*—Monique R. Jackson
(74) *Attorney, Agent, or Firm*—Baker Botts L.L.P.

(57) ABSTRACT

A printing plate is prepared by the method comprising: (a) providing a substrate; and (b) applying by ink jetting to the substrate a fluid composition comprising a compound which comprises at least one nitrogen-containing heterocyclic moiety, providing a printing plate that is ready-to-use on a press without having to develop it. The printing plate of this invention is capable of extended press run length and advantageously avoids the need of chemical development.

37 Claims, No Drawings

METHOD OF PREPARING A PRINTING PLATE AND PRINTING PLATE

CROSS-REFERENCE TO RELATED APPLICATION

This is a continuation-in-part of U.S. patent application Ser. No. 09/244,580, filed Feb. 4, 1999 pending, which is hereby incorporated by reference in its entirety.

FIELD OF THE INVENTION

This invention relates to a printing plate, a method of making such a printing plate, and a method of printing using such a plate to form a desired image on a medium. More particularly, the printing plate of this invention employs a fluid composition comprising a compound which comprises a nitrogen-containing heterocyclic moiety that is acid-neutralized to adhere to a substrate that has a plurality of basic sites. The fluid composition is applied by ink jetting to a substrate, providing a printing plate that is ready-to-use on a press without having to develop it.

BACKGROUND OF THE INVENTION

The offset lithographic printing process has long used a developed planographic printing plate having oleophilic image areas and hydrophilic non-image areas. The plate is commonly dampened before or during inking with an oil-based ink composition. The dampening process utilizes an aqueous fountain solution such as those described in U.S. Pat. Nos. 3,877,372, 4,278,467 and 4,854,969. When water is applied to the plate, the water will form a film on the hydrophilic areas, which are the non-image areas of the plate, but will contract into tiny droplets on the oleophilic plate areas, which are the image areas. When a roller carrying an oil-based ink composition is passed over the dampened plate, it will not ink the non-image areas that are covered by the aqueous film, but will emulsify the water droplets on the water repellant image areas, which will then take up ink. The resulting ink image is transferred, or "offset," onto a rubber blanket, which is then used to print onto a medium such as paper.

It has been proposed to apply "direct" ink jet printing techniques to lithographic printing. For example, European Patent Publication No. 503,621 discloses a direct method to make lithographic plates by jetting a photocurable ink onto the plate substrate, and then exposing the plate to ultraviolet radiation to harden the image area. An oil-based ink may then be transferred to the image area for printing onto a printing medium. But, neither the resolution of ink drops jetted onto the substrate, nor the durability of the lithographic printing plate with respect to printing runlength was disclosed.

It has also been proposed to apply the direct ink jet printing techniques without the additional steps of chemical development of the plate. This approach advantageously results in lower production costs and a more environmentally acceptable printing process. However, in such techniques it is difficult to control the spreading of the ink-jetted fluid that forms the oleophilic ink-accepting regions on the printing plate substrate. Such "dot spreading" causes lower printing image resolution and reduced image quality. For example, European Patent Application No. 591,916 A2 discloses a water-based ink having a polymer containing anhydride groups which are thermally cross-linked with a hydroxy-functional polymer. This formulation is applied by jetting the formulation which is at room temperature onto a room temperature substrate. However, this formulation does not achieve good control of dot spreading.

U.S. Pat. No. 4,833,486 discloses the apparatus and process for imaging a plate with a "hot melt" type of inkjet printer. The image is produced by jetting at high temperature a "phase change" type of ink which solidifies when it hits the cooler substrate. The ink becomes instantaneously solid rather than remaining a liquid or gel which is thereafter cured to form a solid. However, such an ink does not provide good resistance to press run due to the wax-type nature of the ink formulation.

U.S. Pat. No. 5,942,335 discloses the use of a polymer containing a nitrogen-containing heterocyclic group, namely a polymer of 4-vinyl pyridine, in the formulation of an ink receiving layer of an ink jet recording sheet. However, the use of such a compound in a fluid composition applied directly to a printing plate substrate to form an imaged, ink-receptive layer is not disclosed.

Thus, it would be advantageous to employ a printing plate capable of extended press run length which does not require chemical development.

It is one object of this invention to provide such a printing plate. It is another object of this invention to provide a method of preparing such a printing plate. It is yet another object of this invention to provide a method of using such a printing plate. The printing plate of this invention may advantageously be prepared without a chemical development step typically required. The printing plate of this invention is also capable of extended press run length.

SUMMARY OF THE INVENTION

The fluid composition of this invention is suitable for ink jetting upon a substrate and comprises a compound that comprises at least one nitrogen-containing heterocyclic moiety, wherein the nitrogen-containing heterocyclic moieties of the compound are at least partially neutralized with an acid, in aqueous solution.

The printing plate of this invention is prepared by: (a) providing a substrate; and (b) applying by ink jetting to the substrate a fluid composition as described. In a preferred embodiment, the compound that comprises at least one nitrogen-containing heterocyclic moiety is selected from the group consisting of polymers or copolymers of 2-vinylpyridines, polymers or copolymers of 4-vinylpyridines, polymers or copolymers of ethylimidazolidone methacrylates, 2-pyridyl ethyl trimethoxysilanes, and mixtures thereof. In particularly preferred embodiments, the nitrogen-containing heterocyclic moieties of the compound are partially or fully neutralized with formic acid.

The printing plate of this invention is capable of extended press run length and advantageously avoids the need of chemical development.

DETAILED DESCRIPTION OF THE INVENTION

To achieve extended printing runs, the oleophilic material must adhere well to the substrate. Adhesion of the oleophilic material may be controlled in at least two ways. First, the oleophilic material should have a chemical interaction with the substrate that provides a type of chemical binding and promotes adhesion. For example, the chemical composition of the oleophilic material can be varied to promote its adhesion to the substrate. Also, the composition of the substrate can be varied to increase binding of the oleophilic material. Second, the substrate should provide microscopic topology that allows the oleophilic material to interlock mechanically with the substrate when dry or hardened. Mechanical interlocking can be affected by roughening the surface of the substrate. Thus, by controlling these variables, a printing plate can be made with increased adhesion of the oleophilic material, and correspondingly longer printing run operation.

In the invention described here, the oleophilic material is placed on the substrate by ink jetting a fluid composition comprising the oleophilic material. Because the fluid composition is the vehicle to carry the oleophilic material, the wettability of the substrate by the ink-jetted droplets of fluid composition and the spreading of the ink-jetted droplets are properties that affect resolution of the printing process. Too much spreading of the ink-jetted droplets of fluid composition will reduce printing resolution. The substrates used here typically have high surface tension and allow aqueous fluids to spread completely and rapidly over their surface. While this benefits adhesion of the oleophilic material to the substrate, it disadvantageously reduces image resolution in printing. Here, the fluid composition is prepared to balance these properties, and provide good adhesion for longer press runs in conjunction with high image resolution.

The spreading of droplets is reduced in two ways by the present invention. First, the fluid composition comprising the oleophilic material is interfacially matched to the substrate, as described below. Second, by pretreating the substrate surface with a surfactant to lower its surface tension, the wetting and spreading of droplets is reduced. Thus, by these and other features inherent in the composition and method described here, excellent resolution can be obtained, as well as long-lasting adhesion of the dried oleophilic material to the substrate.

The printing plate of this invention encompasses lithographic printing plates, flexographic printing plates, and gravure printing plates.

Conventional printing plate substrates such as aluminum, polymeric film, and paper may be used as the printing plate substrate of this invention. The printing plate substrate may be subjected to treatments such as electrograining, anodization, and silication to enhance its surface characteristics. The surface characteristics that are modified by such treatments are roughness, topology, and the nature and quantity of surface chemical sites. In a preferred embodiment the printing plate surface comprises a plurality of basic sites, such as, but not limited to, sodium silicate groups.

Substrates that can be employed are given in Table 1. Substrates chosen for use in this invention are preferably based on aluminum oxide, and may be subjected to various conventional surface treatments as are well known to those skilled in the art to give a surface that has a plurality of basic sites in the Bronsted acid-base view. These treatments also result in different surface roughness, topology, and surface chemical sites, as summarized in Table 1.

TABLE 1

Substrates for printing plates

| Substrate name | Surface Treatment | Interlayer Treatment | Surface Property |
|---|---|---|---|
| AA | Quartz Grained and Anodized | None | Acidic |
| EG-PVPA | Electrograined and Anodized | Polyvinyl phosphoric acid | Acidic |
| PF | Electrograined and Anodized | Sodium dihydrogen phosphate/Sodium fluoride | Acidic |

TABLE 1-continued

Substrates for printing plates

| Substrate name | Surface Treatment | Interlayer Treatment | Surface Property |
|---|---|---|---|
| G20 | Electrograined and Anodized | Vinylphosphonic acid/acrylamide copolymer | Acidic/ Amphoteric |
| EG-Sil | Electrograined and Anodized | Sodium Silicate | Basic |
| DS-Sil | Chemically Grained and Anodized | Sodium Silicate | Basic |
| PG-Sil | Pumice Grained and Anodized | Sodium Silicate | Basic |
| CHB-Sil | Chemically Grained, Anodized and Silicated | Sodium Silicate | Basic |

"AA" means "as anodized." The aluminum surface is first quartz grained and then anodized using DC current of about 8 A/cm$^2$ for 30 seconds in a $H_2SO_4$ solution (280 g/liter) at 30° C.

"EG" means "electrolytic graining." The aluminum surface is first degreased, etched and subjected to a desmut step (removal of reaction products of aluminum and the etchant). The plate is then electrolytically grained using an AC current of 30–60 A/cm$^2$ in a hydrochloric acid solution (10 g/liter) for 30 seconds at 25° C., followed by a post-etching alkaline wash and a desmut step. The grained plate is then anodized using DC current of about 8 A/cm$^2$ for 30 seconds in a $H_2SO_4$ solution (280 g/liter) at 30° C.

"PVPA" is a polyvinylphosphonic acid. The plate is immersed in a PVPA solution and then washed with deionized water and dried at room temperature.

"DS" means "double sided smooth." The aluminum oxide plate is first degreased, etched or chemically grained, and subjected to a desmut step. The smooth plate is then anodized.

"Sil" means the anodized plate is immersed in a sodium silicate solution to coat it with an interlayer. The coated plate is then rinsed with deionized water and dried at room temperature.

"PG" means "pumice grained." The aluminum surface is first degreased, etched and subjected to a desmut step. The plate is then mechanically grained by subjecting it to a 30% pumice slurry at 30° C., followed by a post-etching step and a desmut step. The grained plate is then anodized using DC current of about 8 A/cm$^2$ for 30 seconds in an $H_2SO_4$ solution (280 g/liter) at 30° C. The anodized plate is then coated with an interlayer.

"G20" is a printing plate substrate which is described in U.S. Pat. No. 5,368,974, the disclosure of which is incorporated herein by reference in its entirety.

"CHB" means chemical graining in a basic solution. After an aluminum substrate is subjected to a matte finishing process, a solution of 50 to 100 g/liter NaOH is used during graining at 50 to 70° C. for 1 minute. The grained plate is then anodized using DC current of about 8 A/cm$^2$ for 30 seconds in an $H_2SO_4$ solution (280 g/liter) at 30° C. The anodized plate is then coated with a silicated interlayer.

"PF" substrate has a phosphate fluoride interlayer. The process solution contains sodium dihydrogen phosphate and sodium fluoride. The anodized substrate is treated in the solution at 70° C. for a dwell time of 60 seconds, followed by a water rinse, and drying. The deposited dihydrogen phosphate is about 500 mg/m$^2$.

A "basic" surface will have a plurality of basic sites and acidic sites present, with the basic sites predominating to some degree. Similarly, an "acidic" surface will have a plurality of acidic sites and basic sites present, with the acidic sites predominating to some degree. It is known by one of ordinary skill in the art that the PG-Sil printing plate substrate appears to have a higher silicate site density than the DS-Sil printing plate substrate, and is more basic. It is also known that the G20 printing plate substrate exhibits less acidic character than AA printing plate substrates.

In preferred embodiments, the oleophilic compound of the present invention that forms the ink-receiving layer may be prepared from a starting polymer that comprises base groups by partially or filly neutralizing the base groups with acid to give a product polymer that comprises the base groups and conjugate acid groups, or comprises solely the conjugate acid groups. The oleophilic product polymer is used to make long-lasting printing plates by enhancing the adhesion of the product polymer to the substrate. The conjugate acid groups of the product polymer react with, for example, the silicated sites, $-SiO^{-Na+}$, of the basic substrate in ionic double exchange to bind the polymer to the substrate. This chemical binding works in combination with the physico-chemical adsorption of the product polymer to the roughened substrate to provide strong adhesion of the ink-receiving layer, a more durable printing plate, and longer printing press runs.

The starting polymer of preferred embodiments comprises a monomer that comprises a nitrogen-containing heterocyclic moiety. The starting polymer can be a homopolymer, copolymer, terpolymer, and the like. By "copolymer" we mean any polymer comprised of more than one type of monomer, prepared in a copolymerization. By "terpolymer" we mean a polymer consisting essentially of three types of monomers, prepared in a copolymerization. Thus, a copolymer can include a terpolymer.

In preferred embodiments, the oleophilic compound of the present invention that forms the ink-receiving layer may also be prepared from a starting monomeric compound that comprises base groups, such as a substituted silane.

A starting polymer of this invention preferably has a surface energy, as measured according to the Owens-Wendt method, as described in *J. Applied Polymer Science*, 1969, Vol. 13, pp. 1741, based on two liquid probes, water and diiodomethane, of less than about 50 dynes/cm.

The starting polymer most preferably comprises a monomer selected from the group consisting of 2-vinylpyridines, 4-vinylpyridines, ethylimidazolidone methacrylates, and mixtures thereof. These polymers comprise a nitrogen-containing heterocyclic moiety that can react with formic acid to produce conjugate acid groups, $XNH^+HCOO^-$, where XN is a pyridyl or uridyl group, to react with the substrate.

In preferred embodiments, the oleophilic compound of the present invention that forms the ink-receiving layer is a compound which comprises at least one nitrogen-containing heterocyclic moiety, and the nitrogen-containing heterocyclic moieties are at least partially neutralized with an acid, resulting in excellent adhesion to the substrate. An illustrative example of the oleophilic compound of the present invention that forms the ink-receiving layer is 2-pyridyl ethyl trimethoxysilanes, and the like.

Acids suitable for neutralizing the base groups of the oleophilic compound conform to one of the formulae in the group consisting of $H(CH_2)_nCOOH$, and $HOCHRCOOH$, where R is $-H$, $-CH_3$, or $-CH_2CH_3$, and n is from zero to six. Acids used in preferred embodiments are formic, acetic, lactic, and glycolic, while formic acid is especially preferred.

The ink-receptive layer produced with the oleophilic compound has excellent adhesion to the substrate surface, and as set forth in further detail below, the resulting printing plate exhibits extended press run length. Advantageously, the superior results of the printing plate of this invention are achieved without chemical development.

The fluid composition comprising the oleophilic compound is preferably applied by ink jetting to the substrate surface, typically by an ink jet printer using equipment and techniques which are well known to those skilled in the art. In this manner, the substrate is imaged so that after the fluid composition dries, an ink receptive layer is formed in the desired image on the surface of the substrate.

Without intending to be bound by any one particular theory, the nature of the oleophilic compound enhances the resolution achieved in printing because the fluid composition can be "interfacially matched" to the substrate. By "interfacial matching" we mean providing an oleophilic compound comprising conjugate acid groups to be used with a basic substrate, or conversely, providing an oleophilic compound comprising conjugate base groups to be used with an acidic substrate. The droplet of fluid composition on the substrate spreads as a primary film in advance of the bulk of the droplet. Further, water and formic acid in the advancing primary film evaporate relatively quickly, leaving behind an increased concentration of neutral base groups on the oleophilic compound. These neutral base groups exhibit repulsion from the basic sites of the substrate, and slow the spreading of the droplets of fluid composition on the substrate surface. At the same time, in the bulk of the droplet, an excess of conjugate acid groups on the neutralized compound continue to give good adhesion to the substrate. Thus, reduced droplet spreading is achieved with good adhesion of the oleophilic compound to the silicated plate.

In preferred embodiments, the fluid composition contains a humectant to help retain water in the ink jet nozzle during idle periods. Suitable humectants include glycerol, aliphatic glycols, aliphatic glycol ethers, and mixtures thereof. The fluid composition may also contain other additives, such as colorants, biocides, corrosion inhibitors, and anti-foam agents, as used by those of skill in the art of ink jet printing, without loss of the characteristic properties of this invention.

Adsorbing a surfactant to a conventional printing plate substrate, prior to application of an ink receptive layer, can improve the image resolution achieved. Such a surfactant-pretreated substrate will be termed a "printing plate precursor" herein. A printing plate may be prepared from the printing plate precursor by imagewise applying a fluid composition as described above to the substrate. In a preferred embodiment, the fluid composition is applied by means of an ink jet printer, and then dried to form an ink receptive layer in the form of the desired image. Advantageously, chemical development of the printing plate is not required.

Adhesion of the oleophilic compound from the fluid composition to the substrate after drying is not diminished substantially by the presence of the precursor plate surfactant, which tends only to slow the spreading of the aqueous droplet deposited by the ink jet nozzle. Thus, the precursor plate surfactant can increase resolution without reducing press run length. Surfactants that can be used for the precursor include alkyl tail surfactants, fluorosurfactants and siliconated surfactants.

Illustrative examples of alkyl tail surfactants include sodium dodecylsulfate, isopropylamine salts of an alkylarylsulfonate, sodium dioctyl succinate, sodium methyl cocoyl taurate, dodecylbenzene sulfonate, alkyl ether phosphoric acid, N-dodecylamine, dicocoamine, 1-aminoethyl-2-alkylimidazoline, 1-hydroxyethyl-2-alkylimidazoline, and cocoalkyl trimethyl quaternary ammonium chloride, polyethylene tridecyl ether phosphate, and the like.

Illustrative examples of fluorosurfactants useful in preferred embodiments of the present invention and their commercial trade names are set forth in Table 2.

TABLE 2

Fluorosurfactants useful in preferred embodiments

| Trade Name | Chemical Structure | Type |
|---|---|---|
| Zonyl FSD | $F(CF_2CF_2)_{1-7}$-alkyl-$N^+R_3Cl^-$ | Cationic |
| Fluorad FC-135 | $C_8F_{17}SO_2NHC_3H_6N^-(CH_3)_3I^-$ | Cationic |
| Zonyl FSA | $F(CF_2CF_2)_{1-7}CH_2CH_2SCH_2CH_2CO_2\text{-}Li^+$ | Anionic |
| Fluorad FC-129 | $C_8F_{17}SO_2N(C_2H_5)CH_2CO_2^-K^+$ | Anionic |
| Zonyl FSP | $(F(CF_2CF_2)_{1-7}CH_2CH_2O)_{1,2}PO\ (O^-NH_4^+)_{1,2}$ | Anionic |
| Zonyl FSJ[1] | $(F(CF_2CF_2)_{1-7}CH_2CH_2O)_{1,2}PO\ (O^-NH_4^+)_{1,2}$ | Anionic |
| Fluorad FC-120 | $C_{10}F_{21}SO_3^-NH_4^+$ | Anionic |
| Zonyl FS-62 | $C_6F_{13}CH_2CH_2SO_3H,\ C_6F_{13}CH_2CH_2SO_3^{-}NH_4^+$ | Anionic |
| Zonyl FSK | $F(CF_2CF_2)_{1-7}CH_2CHOAcCH_2N^+R_2CH_2COO^-$ | Amphoteric |
| Fluorad FC-100[2] | $R^{**}SO_3^-$ | Amphoteric |
| Fluorad FC-170C | $C_8F_{17}SO_2N(C_2H_5)\ (CH_2CH_2O)_xH$ | Nonionic |
| Fluorad FC-171 | $C_8F_{17}SO_2N(C_2H_5)\ (CH_2CH_2O)_xCH_3$ | Nonionic |
| Zonyl FSO[3] | $F(CF_2CF_2)_{1-7}CH_2CH_2O\ (CH_2CH_2O)_yH$ | Nonionic |
| Zonyl FS-300[3] | $F(CF_2CF_2)_{1-7}CH_2CH_2O\ (CH_2CH_2O)_zH\ (z > y)$ | Nonionic |

[1]FSJ also contains a nonfluorinated surfactant.
[2]R** contains an ammonium function.
[3]y or z = 0 to about 25.

(1) FSJ also contains a nonfluorinated surfactant.
(2) R ** contains an ammonium function.
(3) y or z=0 to about 25.

ZONYL surfactants are commercially available from E.I. du Pont de Nemours & Co. and have a distribution of perfluoroalkyl chain length. FLUORAD surfactants are commercially available from 3M Company and have a narrow distribution of the hydrophobic chain length.

Illustrative siliconated surfactants include the following non-exhaustive listing: polyether modified poly-dimethyl-siloxane, silicone glycol, polyether modified dimethyl-polysiloxane copolymer, and polyether-polyester modified hydroxy functional polydimethyl-siloxane.

The precursor plate surfactant may be adsorbed onto the substrate by any conventional method, preferably by immersion of the substrate in an aqueous solution of the surfactant for a time, typically one minute, which is effective to permit adsorption of the surfactant upon the substrate. In a particularly preferred embodiment, any non-adsorbed surfactant is then removed from the printing plate substrate surface. Preferably, the substrate is rinsed with water to remove non-adsorbed surfactant, then dried. The resulting printing plate precursor has a surfactant on at least one surface, in an amount effective to improve the resolution of printing.

An imaged substrate prepared by imagewise applying a fluid composition to a substrate could also be used, for example, as a precursor for a printed circuit board in which conductive metals are deposited onto the imaged substrate.

The following examples are given to illustrate preferred embodiments of the present invention and are not intended to limit the invention in any way. It should be understood that the present invention is not limited to the above-mentioned embodiments. Numerous modifications can be made by one skilled in the art having the benefits of the teachings given here. Such modifications should be taken as being encompassed within the scope of the present invention as set forth in the appended claims.

EXAMPLE 1

Fluid composition R2884-1384 was prepared by mixing R2930-14, a 4-vinylpyridine (4-VP) product copolymer, 3 weight percent, with 2 weight percent glycerol humectant, and 0.3 weight percent SURFYNOL 465 ink jet surfactant, in 94.7 weight percent deionized water solution. Fluid composition 1384 was then ink-jetted with an EPSON 740 printer onto an EG-Sil substrate (Table 1) that was pretreated with FLUORAD FC-135 precursor plate surfactant (0.1 weight percent in water). After drying without processing or developing, the image on the substrate did not rub off with a pad impregnated with ink and water. This printing plate was used in an accelerated press trial of 15,000 impressions on paper, and no evidence of image wearing was observed. Thus, the plate was suitable for low volume printing. The accelerated press trial used a rubber transfer blanket of high hardness that accelerates wear of the printing plate. This fluid composition comprising the product copolymer was also suitable for low volume printing on an acidic AA substrate (Table 1) pretreated with FLUORAD FC-129 surfactant (0.1 weight percent in water).

A dot size test was used to measure spreading behavior of the fluid composition on a substrate plate as follows: The fluid composition was ink jetted with an EPSON 740 printer onto a substrate and the dot size was measured with a microscope. Fluid composition R2884-1384 on substrate EG-Sil, without the use of a precursor plate surfactant, exhibited a dot size of 48 micrometers, which was reduced to 34 micrometers when FLUORAD FC-135 precursor plate surfactant was used.

The 4-vinylpyridine product copolymer R2930-14 was prepared from methyl methacrylate (MMA), 4-vinylpyridine (4-VP), ethyl acrylate (EA), and hydroxy-ethy lacrylate (HEA) in the ratio 45.6:26.7:14.83:12.87. A 2 L roundbottom flask was charged with 240 g methyl isobutyl ketone (MIBK), and the solvent was stirred and heated to reflux under nitrogen. Separate addition fimnels were charged with, (1) a blend of 114 g MMA, 66.75 g 4-VP, 37.08 g EA, and 32.18 g HEA, and (2) a solution of 2 g VAZO 88 (DuPont) in 25 g MIBK. Dual addition was carried out for 2.5 hours at reflux, and then the large funnel rinsed into the batch with 20 g MIBK. During the next 3.5 hours at reflux, two small initiator post-adds of 0.25 g VAZO 88 in 5 g MIBK and 0.16 g VAZO 88 in 5 g MIBK were made. The apparatus was converted from reflux to distillation, and about 136 g distillate removed before heating was halted. At below 85° C., a blend of 21.9 g formic acid and 610 g deionized water was added, and the heterogeneous mixture was heated again while diluting with 40 g deionized water. Azeotropic distillation was carried out until very little upper layer was collecting, at about 99–100° C. Lower layer collected at less than 95° was returned to the reactor the batch reached 100° C. As the opaque, viscous batch cooled, it was diluted with 70 g n-propanol and 7 g additional formic acid. Typical recovery was 948 g, pH 4.2, total solids 25%, Brookfield viscosity 1968 cp (25° C., 20 rpm).

A printing plate that survives an accelerated press trial of fifteen thousand impressions with no evidence of wear of the ink-receiving layer on the substrate or in the printed impressions is suitable for a variety of commercial applications. Such a plate is called suitable for "low volume" printing since a press run of fifteen thousand is a low volume commercial run. It should be noted that passing an accelerated press trial of fifteen thousand impressions with no evidence of wear means that the plate is capable of a substantially longer press run than fifteen thousand under ordinary commercial printing conditions.

A printing plate that shows evidence of wear of the ink-receiving layer on the substrate or in the printed impressions for a run of about one thousand to less than about fifteen thousand impressions is a plate that is suitable for "very low volume" printing. A printing plate that shows evidence of wear of the ink-receiving layer on the substrate or in the printed impressions for a run of less than about one thousand impressions is a plate that is not suitable for commercial printing, although it has utility to form an image.

EXAMPLE 2

Fluid composition R2884-1382 was prepared by mixing a low molecular weight 4-vinylpyridine product homopolymer, 2 weight percent, with 2 weight percent glycerol humectant, and 0.3 weight percent SURFYNOL 465 ink jet surfactant, in 95.7 weight percent deionized water solution. Fluid composition 1382 was then ink-jetted with an EPSON 740 printer onto an EG-Sil substrate (Table 1) that was pretreated with FLUORAD FC-135 precursor plate surfactant (0.1 weight percent in water). After drying without processing or developing, the image on the substrate did not rub off with a pad impregnated with ink and water. This printing plate was used in an accelerated press trial of 15,000 impressions on paper, and no evidence of image wearing was observed. Thus, the plate was suitable for low volume printing. The accelerated press trial used a rubber transfer blanket of high hardness that accelerates wear of the printing plate.

To prepare the low molecular weight 4-vinylpyridine homopolymer, 100 g of 4-vinylpyridine, 5 g of azobisisobutyronitrile, 630 g of dimethylformamide, and 270 g of isopropanol were combined in a 2 L round bottom flask, bubble degasssed with nitrogen, and heated at 60° C. overnight. The resulting solution was precipitated into a ten-fold excess of isopropyl ether, redissolved in methanol, and reprecipitated into isopropyl ether.

The polymer was dried in a vacuum oven overnight at 60° C. to afford a pure white powder, $M_n$=1920, $M_w$=9460. This was neutralized with formic acid to prepare the product homopolymer of the fluid composition.

EXAMPLE 3

Fluid composition R2884-1383 was prepared by mixing starting polymer R2930-13, a WAP acrylic product copolymer, 3 weight percent, with 2 weight percent glycerol humectant, and 0.3 weight percent SURFYNOL 465 ink jet surfactant, in 94.7 weight percent deionized water solution. Fluid composition 1383 was then ink-jetted with an EPSON 740 printer onto an EG-Sil substrate (Table 1) that was pretreated with FLUORAD FC-135 precursor plate surfactant (0.1 weight percent in water). After drying without processing or developing, the image on the substrate did not rub off with a pad impregnated with ink and water. This printing plate was used in an accelerated press trial of 15,000 impressions on paper, and no evidence of image wearing was observed. Thus, the plate was suitable for low volume printing. The accelerated press trial used a rubber transfer blanket of high hardness that accelerates wear of the printing plate. This plate was suitable for very low volume printing (5,000 impressions) on PF substrate.

The WAP acrylic product copolymer, R2930-13, was prepared from methyl methacrylate (MMA), 2-(dimethylamino)ethyl methacrylate (DMAEMA), and ethylimidazolidone methacrylate (MEIO), in the ratio 72:23:5. A 2 L roundbottom flask was charged with 240 g methyl isobutyl ketone (MIBK), and the solvent was stirred and heated to reflux under nitrogen. Separate addition fimnels were charged with, (1) a blend of 57.5 g DMAEMA, 62.5 g Norsocryl 100 (Elf-Atochem: 20% MEIO, 80% MMA), and 130 g MMA, and (2) a solution of 2 g VAZO 88 (DuPont) in 25 g MIBK. Dual addition was carried out for 2.5 hours at reflux, and then the large funnel rinsed into the batch with 20 g MIBK. An hour later, an initiator post-add of 0.25 g VAZO 88 in 5 g MIBK was made. Two hours after the post-add, the apparatus was converted from reflux to distillation, and about 90 g distillate removed before heating was halted. At below 85°, a blend of 15.2 g formic acid and 610 g deionized water was added, and the opaque mixture heated again. Azeotropic distillation began, returning the lower layer to the reactor until the batch temperature reached 95°. This stage continued until the batch reached 100° and no more upper layer was collecting. As the batch cooled, another 30 g deionized water was added with mixing. Typical recovery was 810 g, pH 6.0, total solids 27%, Brookfield viscosity 1450 cp (25°, 20 rpm).

EXAMPLE 4

Fluid composition R2884-144 was prepared by mixing 2-pyridylethyl trimethoxysilane (Gelest, Inc.), 3 weight percent, with formic acid, 0.3 weight percent, glycerol humectant, 2 weight percent, and SURFYNOL 465 ink jet surfactant, 0.3 weight percent, in 94.4 weight percent deionized water solution. Fluid composition 144 was then ink-jetted with an EPSON 740 printer onto an EG-Sil substrate that was pretreated with FLUORAD FC-135 precursor plate surfactant (0.1 weight percent in water). After drying without processing or developing, the image on the substrate did not rub off with a pad impregnated with ink and water. This printing plate was used in an accelerated press trial of 15,000 impressions on paper, and no evidence of image wearing was observed. Thus, the plate was suitable for low volume printing. The accelerated press trial used a rubber transfer blanket of high hardness that accelerates wear of the printing plate. Fluid composition 144 did not adhere and was easily rubbed off with a pad impregnated with ink and water from acidic substrates AA and PF (Table 1).

The invention claimed is:

1. A printing plate prepared by the process comprising:
   (a) providing a substrate having a plurality of basic sites; and
   (b) applying by ink jetting to the substrate surface an aqueous fluid composition comprising a compound which comprises at least one nitrogen-containing heterocyclic moiety, wherein said nitrogen-containing heterocyclic moieties are at least partially neutralized with an acid, the process does not include a chemical development step, and the process does not include a processing step after the application of the fluid composition.

2. The printing plate of claim 1, in which the compound which comprises at least one nitrogen-containing heterocyclic moiety is a polymer or copolymer comprising a monomer selected from the group consisting of 2-vinylpyridines, 4-vinylpyridines, and ethylimidazolidone methacrylates.

3. The printing plate of claim 1, in which the compound which comprises at least one nitrogen-containing heterocyclic moiety is a copolymer of 4-vinylpyridine, methyl methacrylate, ethyl acrylate, and hydroxyethyl acrylate.

4. The printing plate of claim 1, in which the compound which comprises at least one nitrogen-containing heterocyclic moiety is a copolymer of ethylimidazolidone methacrylate, methyl methacrylate, and 2-(dimethylamino) ethyl methacrylate.

5. The printing plate of claim 1, in which the compound which comprises at least one nitrogen-containing heterocyclic moiety is 2-pyridyl ethyl trimethoxysilane.

6. The printing plate of claim 1, in which the acid is selected from the group consisting of formic acid, acetic acid, lactic acid, and glycolic acid.

7. The printing plate of claim 1, in which the substrate is pretreated to form a printing plate precursor with a surfactant selected from the group consisting of alkyl tail surfactants, fluorosurfactants and siliconated surfactants.

8. The printing plate of claim 1, in which the printing plate is dried subsequent to application of the fluid composition.

9. The printing plate of claim 1, in which the fluid composition further comprises a humectant selected from the group consisting of glycerol, ethylene glycol, diethylene glycol, triethylene glycol, propylene glycol, dipropylene glycol, tripropylene glycol, ethylene glycol monomethyl ether, diethylene glycol monomehtyl ether, triethylene glycol monomethl ether, propylene glycol monomethyl ether, dipropylene glycol monomethyl ether and trippropylene glycol monomethyl ether.

10. A printing plate comprising:
    (a) a substrate having a plurality of basic sites; and
    (b) an aqueous fluid composition applied by ink jetting to the substrate surface, without a subsequent chemical development step and without a subsequent processing step, the fluid composition comprising a compound which comprises at least one nitrogen-containing heterocyclic moiety, wherein said nitrogen-containing heterocyclic moieties are at least partially neutralized with an acid.

11. The printing plate of claim 10, in which the compound which comprises at least one nitrogen-containing heterocyclic moiety is a polymer or copolymer comprising a monomer selected from the group consisting of 2-vinylpyridines, 4-vinylpyridines, and ethylimidazolidone methacrylates.

12. The printing plate of claim 10, in which the compound which comprises at least one nitrogen-containing heterocyclic moiety is a copolymer of 4-vinylpyridine, methyl methacrylate, ethyl acrylate, and hydroxyethyl acrylate.

13. The printing plate of claim 10, in which the compound which comprises at least one nitrogen-containing heterocyclic moiety is a copolymer of ethylimidazolidone methacrylate, methyl methacrylate, and 2-(dimethylamino) ethyl methacrylate.

14. The printing plate of claim 10, in which the compound which comprises at least one nitrogen-containing heterocyclic moiety is 2-pyridyl ethyl trimethoxysilane.

15. The printing plate of claim 10, in which the acid is selected from the group consisting of formic acid, acetic acid, lactic acid, and glycolic acid.

16. The printing plate of claim 10, in which the substrate is pretreated to form a printing plate precursor with a surfactant selected from the group consisting of alkyl tail surfactants, fluorosurfactants and siliconated surfactants.

17. The printing plate of claim 10, in which the printing plate is dried subsequent to application of the fluid composition.

18. The printing plate of claim 10, in which the fluid composition further comprises a humectant selected from the group consisting of glycerol, ethylene glycol, diethylene glycol, triethylene glycol, propylene glycol, dipropylene glycol, tripropylene glycol, ethylene glycol monomehtyl ether, diethylene glycol monomehtyl ether, triethylene glycol monomethl ether, propylene glycol monomethyl ether, dipropylene glycol monomethyl ether and trippropylene glycol monomethyl ether.

19. A method of preparing a printing plate comprising:
    (a) providing a substrate having a plurality of basic sites; and
    (b) applying by ink jetting to the substrate surface an aqueous fluid composition comprising a compound which comprises at least one nitrogen-containing heterocyclic moiety, wherein said nitrogen-containing heterocyclic moieties are at least partially neutralized with an acid, the method does not include a chemical development step, and the method does not include a processing step after the application of the fluid composition.

20. The method of claim 19, in which the compound which comprises at least one nitrogen-containing heterocyclic moiety is a polymer or copolymer comprising a monomer selected from the group consisting of 2-vinylpyridines, 4-vinylpyridines, and ethylimidazolidone methacrylates.

21. The method of claim 19, which the compound which comprises at least one nitrogen-containing heterocyclic moiety is a copolymer of 4-vinylpyridine, methyl methacrylate, ethyl acrylate, and hydroxyethyl acrylate.

22. The method of claim 19, in which the compound which comprises at least one nitrogen-containing heterocyclic moiety is a copolymer of ethylimidazolidone methacrylate, methyl methacrylate, and 2-(dimethylamino) ethyl methacrylate.

23. The method of claim 19, in which the compound which comprises at least one nitrogen-containing heterocyclic moiety is 2-pyridyl ethyl trimethoxysilane.

24. The method of claim 19, in which the acid is selected from the group consisting of formic acid, acetic acid, lactic acid, and glycolic acid.

25. The method of claim 19, in which the substrate is pretreated to form a printing plate precursor with a surfactant selected from the group consisting of alkyl tail surfactants, fluorosurfactants and siliconated surfactants.

26. The method of claim 19, in which the printing plate is dried subsequent to application of the fluid composition.

27. The method of claim 19, which the fluid composition further comprises a humectant selected from the group consisting of glycerol, ethylene glycol, diethylene glycol, triethylene glycol, propylene glycol, dipropylene glycol, tripropylene glycol, ethylene glycol monomethyl ether, diethylene glycol monomethyl ether, triethylene glycol monomethyl ether, propylene glycol monomethyl ether, dipropylene glycol monomethyl ether and tripropylene glycol monomethyl ether.

28. A method of forming an image onto a substrate comprising:
   (a) providing a substrate having a plurality of basic sites;
   (b) applying by ink jetting to the substrate surface an aqueous fluid composition comprising a compound which comprises at least one nitrogen-containing heterocyclic moiety, wherein said nitrogen-containing heterocyclic moieties are at least partially neutralized with an acid; and
   (c) drying the fluid composition on the substrate, wherein the method does not include a chemical development step and the method does not include a processing step after the drying step.

29. An imaged substrate comprising:
   (a) a substrate having a plurality of basic sites; and
   (b) an aqueous fluid composition imagewise applied to the substrate surface, without a subsequent chemical development step and without a subsequent processing step, the fluid composition comprising a compound which comprises at least one nitrogen-containing heterocyclic moiety, in which said nitrogen-containing heterocyclic moieties are at least partially neutralized with an acid.

30. The imaged substrate of claim 29, in which the aqueous fluid composition is applied to the substrate by ink jetting.

31. A method of copying an image onto a medium comprising:
   (a) providing a substrate having a plurality of basic sites;
   (b) applying by ink jetting to the substrate surface an aqueous fluid composition comprising a compound which comprises at least one nitrogen-containing heterocyclic moiety, wherein said nitrogen-containing heterocyclic moieties are at least partially neutralized with an acid, wherein the fluid composition forms the image;
   (c) drying the fluid composition on the substrate;
   (d) contacting the dried formed image with an ink thereby coating the formed image with the ink; and
   (e) contacting the formed image with the ink with a medium capable of receiving the ink in the form of an image, wherein the method does not include a chemical development step and the method does not include a processing step after the drying step.

32. A printing plate prepared by the process comprising:
   (a) providing a substrate;
   (b) pretreating the substrate with a surfactant selected from the group consisting of alkyl tail surfactants, fluorosurfactants and siliconated surfactants; and
   (c) applying by ink jetting to the substrate surface an aqueous fluid composition comprising a compound which comprises at least one nitrogen-containing heterocyclic moiety, wherein said nitrogen-containing heterocyclic moieties are at least partially neutralized with an acid, the process does not include a chemical development step, and the process does not include a processing step after the application of the fluid composition.

33. A printing plate comprising:
   (a) a substrate pretreated with a surfactant selected from the group consisting of alkyl tail surfactants, fluorosurfactants and siliconated surfactants; and
   (b) an aqueous fluid composition applied by ink jetting to the substrate surface, without a subsequent chemical development step and without a subsequent processing step, the fluid composition comprising a compound which comprises at least one nitrogen-containing heterocyclic moiety, wherein said nitrogen-containing heterocyclic moieties are at least partially neutralized with an acid.

34. A method of preparing a printing plate comprising:
   (a) providing a substrate;
   (b) pretreating the substrate with a surfactant selected from the group consisting of alkyl tail surfactants, fluorosurfactants and siliconated surfactants; and
   (c) applying by ink jetting to the substrate surface an aqueous fluid composition comprising a compound which comprises at least one nitrogen-containing heterocyclic moiety, wherein said nitrogen-containing heterocyclic moieties are at least partially neutralized with an acid, the method does not include a chemical development step, and the method does not include a processing step after the application of the fluid composition.

35. A method of forming an image onto a substrate comprising:
   (a) providing a substrate;
   (b) pretreating the substrate with a surfactant selected from the group consisting of alkyl tail surfactants, fluorosurfactants and siliconated surfactants;
   (c) applying by ink jetting to the substrate surface an aqueous fluid composition comprising a compound which comprises at least one nitrogen-containing heterocyclic moiety, wherein said nitrogen-containing heterocyclic moieties are at least partially neutralized with an acid; and
   (d) drying the fluid composition on the substrate, wherein the method does not include a chemical development step and the method does not include a processing step after the drying step.

36. An imaged substrate comprising:
   (a) a substrate pretreated with a surfactant selected from the group consisting of alkyl tail surfactants, fluorosurfactants and siliconated surfactants; and
   (b) an aqueous fluid composition imagewise applied to the substrate surface, without a subsequent chemical development step and without a subsequent processing step, the fluid composition comprising a compound which comprises at least one nitrogen-containing heterocyclic moiety, in which said nitrogen-containing heterocyclic moieties are at least partially neutralized with an acid.

37. A method of copying an image onto a medium comprising:
   (a) providing a substrate;
   (b) pretreating the substrate with a surfactant selected from the group consisting of alkyl tail surfactants, fluorosurfactants and siliconated surfactants;
   (c) applying by ink jetting to the substrate surface an aqueous fluid composition comprising a compound which comprises at least one nitrogen-containing heterocyclic moiety, wherein said nitrogen-containing heterocyclic moieties are at least partially neutralized with an acid, wherein the fluid composition forms the image;

(d) drying the fluid composition on the substrate;
(e) contacting the dried formed image with an ink thereby coating the formed image with the ink; and
(f) contacting the formed image with the ink with a medium capable of receiving the ink in the form of an image, wherein the method does not include a chemical development step and the method does not include a processing step after the drying step.

* * * * *